United States Patent [19] [11] 3,923,868
Henrick [45] Dec. 2, 1975

[54] SUBSTITUTED ALKYLTHIO BUTENOIC ACIDS AND ESTERS

[75] Inventor: Clive A. Henrick, Palo Alto, Calif.

[73] Assignee: Zoecon Corporation, Palo Alto, Calif.

[22] Filed: June 6, 1973

[21] Appl. No.: 367,613

[52] U.S. Cl. ......... 260/481 R; 260/399; 260/456 P; 260/468 R; 260/470; 260/471 R; 260/473 R; 260/473 G; 260/476; 260/482 R; 260/486 R; 260/487; 260/488 H; 260/535 R; 260/608 I; 260/609 R; 260/614 R; 260/615 R; 260/632 R; 260/516; 424/305; 424/308; 424/309; 424/311; 424/312; 424/314; 424/317
[51] Int. Cl. .......................................... C07c 149/20
[58] Field of Search ......... 260/481 R, 535 S, 535 R, 260/488 H

[56] References Cited
UNITED STATES PATENTS

| 3,040,086 | 6/1962 | Miller | 260/481 R |
| 3,078,298 | 2/1963 | Gregory et al. | 260/481 R |
| 3,097,998 | 7/1963 | Miller | 260/481 R |
| 3,466,322 | 9/1969 | Elam | 260/481 R |
| 3,476,665 | 4/1969 | Ottenheym et al. | 260/481 R |
| 3,732,264 | 4/1973 | Baum et al. | 260/535 R |
| 3,737,442 | 6/1973 | Baum | 260/481 R |
| 3,773,823 | 11/1973 | Jarolim et al. | 260/535 R |

FOREIGN PATENTS OR APPLICATIONS

| 898,098 | 6/1962 | United Kingdom | 260/481 R |

Primary Examiner—Lorraine A. Weinberger
Assistant Examiner—John F. Terapane
Attorney, Agent, or Firm—Donald W. Erickson

[57] ABSTRACT

Aliphatic 5-thia esters and acids, and derivatives thereof, useful for the control of insects.

11 Claims, No Drawings

SUBSTITUTED ALKYLTHIO BUTENOIC ACIDS AND ESTERS

This invention relates to novel 5-thia aliphatic unsaturated esters and acids, derivatives thereof, syntheses thereof and the control of insects.

More particularly, the novel 5-thia compounds of the present invention are represented by the following formula A:

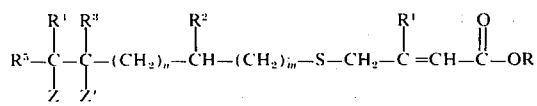

wherein,
R is hydrogen, lower alkyl, lower alkenyl, lower alkynyl, cycloalkyl, aryl or aralkyl;
each of $R^1$, $R^2$, $R^4$ and $R^5$ is lower alkyl;
$R^3$ is hydrogen or methyl;
$n$ is one or two;
$m$ is zero, one or two;
Z is hydrogen, lower alkyl, chloro, fluoro, bromo, or the group $-OR^6$ in which $R^6$ is hydrogen, lower alkyl, cycloalkyl, aralkyl, aryl or carboxylic acyl; and
Z' is hydrogen or taken with Z, a carbon-carbon bond.

The compounds of formula A are useful for the control of insects. The utility of these compounds as insect control agents is believed to be attributable to their juvenile hormone activity. They are preferably applied to the immature insect, namely - during the embryo, larvae or pupae stage, in view of their effect on metamorphosis and otherwise cause abnormal development leading to death or inability to reproduce. These compounds are effective control agents for Hemipteran, such as Lygaeidae, Miridae and Pyrrhocoridae; Lepidopteran, such as Pyralidae, Noctuidae and Gelechiidae; Coleopteran, such as Tenebrionidae, Crysomelidae and Dermestidae; Dipteran, such as mosquitos, flies; Homopteran, such as aphids and other insects. The compounds can be applied at low dosage levels of the order of 0.01 µg. to 25.0 µg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to vapor of the compounds of formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of $m$, $n$, $R-R^6$, Z and Z' is as defined hereinabove unless otherwise specified.

The compounds of formula A can be prepared according to the following outlined syntheses:

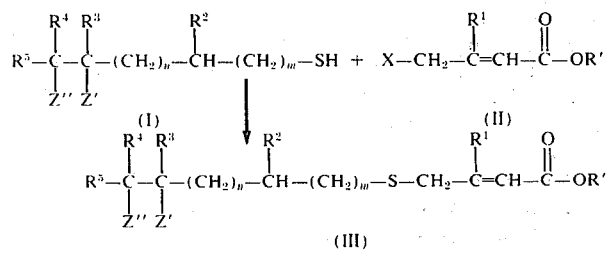

In the above formulas, X is a leaving group, such as bromo or chloro; R' is lower alkyl; Z" is hydrogen, lower alkyl or $-OR^6$ and Z' is hydrogen or taken with Z" is a carbon-carbon bond.

In the practice of the above-outlined syntheses, an alkylating agent of formula II is reacted with the mercapto compound of formula I in the presence of a base, such as sodium hydride, potassium hydride, sodium methoxide, sodium ethoxide, and the like, in an organic solvent inert to the reaction, such as tetrahydrofuran, dimethylformamide, methanol, ethanol, and the like. The compounds of formula I and II are reacted in a mole for mole level and the reaction can be carried out from about room temperature or above, such as reflux temperature.

The esters of formula III are converted into the corresponding free acid by hydrolysis with base, such as potassium carbonate, sodium carbonate, sodium hydroxide, and the like, in an organic solvent, such as a lower alcohol. Other esters or the present invention can be prepared by transesterification of conversion of the acid into the acid halide by treatment with thionyl chloride, oxalyl chloride, phosphorus pentabromide, or the like, and then reacting the acid halide with the alcohol corresponding to the ester moiety desired.

Compounds of formula A, in which Z is halogen, can be prepared from a compound of formula A having a terminal double bond (Z' taken with Z is a carbon-carbon bond) by treatment with a hydrogen halide or acetyl halide in an organic solvent, such as a lower alcohol or halogenated hydrocarbon.

A mercapto compound of formula I can be prepared from the corresponding C-1 halide of formula I' using conventional methods. Thus, by treating the respective halide with thiourea in an alcohol solvent followed by alkaline hydrolysis, or with sodium hydrosulfide in dimethylformamide, or the like, the corresponding mercaptan is obtained.

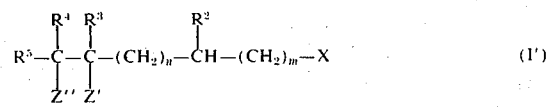

In formula I', each of $m$, $n$, $R^2-R^5$, X, Z' and Z" is as defined hereinabove.

The respective C-1 bromide or chloride of formula I' can be prepared according to the procedures of U.S. Pat. Nos. 3,709,914 and 3,732,254. Briefly stated, a halide of formula I' can be prepared by reducing the corresponding ketone ($m$ is zero) or aldehyde ($m$ is one or two) precursor with, for example, sodium borohydride in ethanol, to yield an alcohol which is then converted into a compound of formula I' by treatment with phosphorus trihalide, phosphorus pentahalide, lithium chloride or bromide in acetone, or the like. When lithium chloride or lithium bromide is used, the alcohol is first converted into the corresponding mesylate or tosylate according to the procedure of Crossland et al., J. Org. Chem. 35, 3195 (1970) and then reacted with the lithium halide as described by Cornforth et al., J. Chem. Soc. (London) 2539 (1959) and Weiberg and Lowry, J. Amer. Chem. Soc. 85, 3188 (1963).

Compounds of formula A wherein Z is —$OR^6$ ($R^6$ is hydrogen) can be prepared from a compound of formula A having a terminal double bond (Z' taken with Z is a carbon-carbon bond) by the addition of water to said terminal olefinic bond using a mercuric salt followed by reduction of the oxymercurial intermediate in situ. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, J. Amer. Chem. Soc. 91, 5646 (1969); Brown et al., J. Amer. Chem. Soc. 89, 1522 and 1524 (1967); and Wakabayashi, J. Med. Chem. 12, 191 (1969). By conducting the reaction in the presence of an alcohol ($R^6$—OH) such as methanol, ethanol, isopropyl alcohol, benzyl alcohol, cyclopentyl alcohol, and the like, the corresponding ether is prepared. The compounds of formula A wherein Z is —$OR^6$ in which $R^6$ is carboxylic acyl can be prepared from a compound of formula A wherein Z is —OH by reaction with a carboxylic acid chloride or bromide or a carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

The introduction of the group —$OR^6$ is generally first made on the carbonyl precursor of the halide I' wherein Z' and Z'' form a carbon-carbon bond, using the procedures described hereinabove.

Alkylating agents of formula II are described in the literature and can be prepared according to the procedures of Sisido et al., J. Amer. Chem. Soc. 82, 2286 (1960) and Ahmad et al., J. Chem. Soc. (London) C, 185 (1968).

The term "lower alkyl," as used herein, refers to an alkyl group having a chain length of one to six carbon atoms.

The term "lower alkenyl" refers to an aliphatic monoethylenically unsaturated hydrocarbon of two to six carbons such as prop-2-enyl, but-2-enyl, but-3-enyl, and the like.

The term "lower alkynyl" refers to an aliphatic monoacetylenically unsaturated hydrocarbon of two to six carbon atoms such as prop-2-ynyl, but-2-ynyl, but-3-ynyl, and the like.

The term "cycloalkyl," as used herein, refers to an cyclic alkyl group of three to eight carbon atoms. The term "aralkyl" refers to a monovalent hydrocarbon group in which an aryl group is substituted for a hydrogen atom of an alkyl group such as benzyl, phenylethyl, methylbenzyl, naphthylmethyl and naphthylethyl containing up to 12 carbon atoms. The term "aryl," as used herein, refers to an aromatic group of up to twelve carbon atoms. Typical aromatic groups include phenyl, tolyl, xylyl, mesityl, naphthyl, lower alkylphenyl, such as methylphenyl, ethylphenyl, t-butylphenyl and isopropylphenyl.

The term "carboxylic acyl," as used herein, refers to the acyl group of a carboxylic acid, anhydride or halide. The acyl group is determined by the particular carboxylic acid halide or carboxylic acid anhydride employed in the esterification. Although no upper limitation need be placed on the number of carbon atoms contained in the acyl group within the scope of the present invention, generally it contains from one to 18 carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-phenylpropionate, 3,4-dimethylbenzoate, p-isopropylbenzoate, cyclohexylacetate, stearate, methacrylate, p-choromethylbenzoate, p-methoxybenzoate and p-nitrobenzoate.

The following examples are provided to illustrate the practice of the present invention. Temperature is given in degrees Centigrade.

EXAMPLE 1

To 319 g. of mercuric acetate in 1,000 ml. of dry methanol, cooled in an ice-water bath, is added dropwise over ten minutes 126 g. of 6-methyl-5-hepten-2-one. The mixture is stirred for two hours at 5°–10° and then 168 g. of potassium hydroxide is added followed by addition of 18.9 g. of sodium borohydride in small portions. After stirring for about 2 hours at 10°, water (200 ml.) is added slowly and the mixture left overnight at room temperature. The mixture is decanted and filtered, filtrate concentrated to about half its volume and extracted with ether. The combined ether extracts are washed with brine, dried and evaporated to yield 6-methoxy-6-methylheptan-2-ol, which is purified by distillation or chromatography.

EXAMPLE 2

To a mixture of 57 g. of p-toluenesulfonyl chloride (tosyl chloride) and 100 ml. of dry pyridine, stirring at 0°, is added 40 g. of 6-methoxy-6-methylheptan-2-ol in 50 ml. of dry pyridine, dropwise, in about fifteen minutes. The reaction mixture is stored in the refrigerator overnight. Cold water (300 ml.) is added followed by extraction with cold ether (3 × 200 ml.). The organic phase is washed with cold 3N HCl (6 × 100 ml.) and brine (3 × 100 ml.), dried over calcium sulfate and the ether removed by evaporation to yield the tosylate of 6-methoxy-6-methylheptan-2-ol.

EXAMPLE 3

A slurry of 52 g. of lithium bromide in 200 ml. of acetone is added to the methoxy-tosylate of Example 2 (77.1 g.) in 100 ml. of acetone, with stirring, at 0°–5°. The mixture is stirred at room temperature for thirty hours, filtered and the filtrate concentrated. Hexane is added to the residue and the solution washed with brine, dried and evaporated with vacuo to give 2-bromo-6-methoxy-6-methylheptane, which is purified by distillation.

EXAMPLE 4

To 2.6 g. of sodium hydrosulfide in 25 ml. of dry dimethylformamide, stirring under nitrogen at 5°–10°, is added 6.7 g. of 2-bromo-6-methoxy-6-methylheptane over a period of ten minutes. After stirring for about 2 hours, water and ether is added and the aqueous phase extracted with ether. The combined ether extracts are washed with 10% aqueous HCl and then with brine, dried over calcium sulfate and the solvent evaporated off to give the mercapto compound, 6-methoxy-6-methylheptane-2-thiol.

EXAMPLE 5

300 mg. of sodium hydride (57% dispersion in mineral oil) is washed with pentane and then 3 ml. of dry tetrahydrofuran added. After cooling in ice-bath, 900 mg. of the thiol of Example 4 in 3 ml. of dry tetrahydrofuran is added slowly, with stirring. After 15 minutes, 1.25 g. of ethyl 4-bromo-3-methylbut-2-enoate is added and the mixture stirred for about 2 hours at room temperature. The reaction is poured into water and extracted with ether. The organic phase is washed with 10% aqueous HCl, water and brine, dried over calcium sulfate and the solvent removed by evaporation to yield a crude product having ethyl 5-thia-10-methoxy-3,6,10-trimethylundec-2-enoate as the major component, which is purified by distillation and preparative thin layer chromatography eluting with ethyl acetate:-hexane 1:9. As a minor component there is obtained the following disulfide:

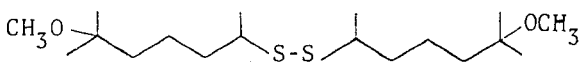

EXAMPLE 6

Sodium borohydride (32.5 g.) in absolute ethanol (1000 ml.) is cooled to about 5° in an ice-water bath and then 242.7 g. of 2,6-dimethylhept-5-en-1-al (melonal) is added over a period of two hours, with stirring, maintaining the temperature at 5°–10°. After addition is complete, the mixture is allowed to come to room temperature and worked up by concentrating to about half volume, diluting with water and extracting with ether. The organic phase is washed with brine, dried over calcium sulfate and solvent evaporated to yield 2,6-dimethylhept5-en-1-ol, which can be purified by distillation.

EXAMPLE 7

A. To 242.5 g. of 2,6-dimethylhept-5-en-1-ol (melonol) in 250 ml. of pyridine is added 323 ml. of acetic anhydride and the mixture left at room temperature for about 16 hours. Then the mixture is poured in cold water and extracted with ether. The ethereal extracts are washed with water, 3N HCl and brine, dried over calcium sulfate and evaporated to yield 1-acetoxy-2,6-dimethylhept-5-ene.

B. 275 g. of 1-acetoxy-2,6-dimethylhept-5-ene (melonol acetate) in 100 ml. of methanol is added to a mixture of 622 g. of mercuric acetate and 700 ml. of methanol, stirring under nitrogen in an ice-bath. The reaction mixture is stirred at room temperature for 5 hours and then cooled to 0°. Potassium hydroxide (328 g.) in 800 ml. of methanol is added, followed by addition of 34 g. of sodium borohydride in 200 ml. of methanol. After about 30 minutes at 0°, water (250 ml.) is added and the mixture left at room temperature for about twenty-two hours. The mixture is decanted, concentrated to half volume, filtered through Celite, diluted with water and extracted with ether. The ethereal extract is washed, dried and evaporated to yield 6-methoxy-2,6-dimethylheptan-1-ol, which is purified by distillation.

EXAMPLE 8

A. The methoxy-alcohol of Example 7 (98.86 g.) in 150 ml. of dry pyridine is reacted with tosyl chloride (133 g.) in 200 ml. of dry pyridine according to the procedure of Example 2 to give the tosylate of 6-methoxy-2,6-dimethylheptan-1-ol.

B. The thus-obtained tosylate (185.5 g.) in 250 ml. of acetone is treated with lithium bromide (100 g.) in 250 ml. of acetone, as described in Example 3, to yield 1-bromo-6-methoxy-2,6-dimethylheptane.

EXAMPLE 9

A mixture of 11.85 g. of 1-bromo-6-methoxy-2,6-dimethylheptane and 3.8 g. of thiourea in 25 ml. of absolute ethanol is refluxed for about forty-eight hours and then allowed to cool to room temperature. Sodium hydroxide (3 g.) in water (30 ml.) is then added and the reaction mixture refluxed for three hours. After cooling to room temperature, the mixture is acidified with dilute aqueous HCl and extracted with ether. The combined ethereal extracts are washed with water and brine until neutral, dried over calcium sulfate and evaporated to yield 6-methoxy-2,6-dimethylheptane-1-thiol.

EXAMPLE 10

To 6.6 g. of 6-methoxy-2,6-dimethylheptane-1-thiol in 20 ml. of dimethylformamide is added, with stirring, under nitrogen, at room temperature, a slurry of 2.4 g. of sodium ethoxide in 30 ml. of ethanol followed by 8.7 g. of ethyl 4-bromo-3-methylbut-2-enoate and 1 g. of sodium iodide. The reaction mixture is stirred for about twenty-four hours at room temperature. Water and ether is added and the organic phase separated. The aqueous phase is extracted with ether. The ether layers are combined, washed with saturated aqueous NaCl and dried over calcium sulfate. The solvent is evaporated off to give a crude material consisting essentially of ethyl 5-thia11-methoxy-3,7,11-trimethyldodec-2-enoate and a disulfide of the following formula

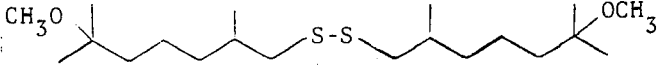

in about 8:2 ratio, which is purified by distillation and preparative thin layer chromatography eluting with 10% ethyl acetate in hexane.

EXAMPLE 11

Following the procedure of Examples 5 or 10, each of the thiols under Column I is reacted with ethyl 4-bromo-3-methylbut-2-enoate to prepare the respective ester under Column II.

I 2,6-dimethylheptane-1-thiol,
2,6-dimethylhept-5-en-1-thiol,
2,6,6-trimethylheptan-1-thiol,
6-methylhept-5-en-2-thiol,
2,6-dimethyloct-5-en-1-thiol,
2,6,6-trimethyloctan-1-thiol,
3,7-dimethyloct-6-en-1-thiol,
7-methoxy-3,7-dimethyloctan-1-thiol, 2,5,6-trimethylhept-5-en-1-thiol,
2,4,5-trimethylhex-4-en-1-thiol,
2,4,5-trimethylhexan-1-thiol,
5-methoxy-2,4,5-trimethylhexan-1-thiol,
7-methylnonane-3-thiol, and
3,7-dimethyloctane-1-thiol.

II ethyl 5-thia-3,7,11-trimethyldodec-2-enoate,
ethyl 5-thia-3,7,11-trimethyldodeca-2,10-dienoate,
ethyl 5-thia-3,7,11,11-tetramethyldodec-2-enoate,
ethyl 5-thia-3,6,10-trimethylundeca-2,9-dienoate,
ethyl 5-thia-3,7,11-trimethyltrideca-2,10-dienoate,
ethyl 5-thia-3,7,11,11-tetramethyltridec-2-enoate,
ethyl 5-thia-3,8,12-trimethyltrideca-2,11-dienoate,
ethyl 5-thia-12-methoxy-3,8,12-trimethyltridec-2-enoate,
ethyl 5-thia-3,7,10,11-tetramethyldodeca-2,10-dienoate,
ethyl 5-thia-3,7,9,10-tetramethylundeca-2,9-dienoate,
ethyl 5-thia-3,7,9,10-tetramethylundec-2-enoate,
ethyl 5-thia-10-methoxy-3,7,9,10-tetramethylundec-2-enoate,
ethyl 5-thia-6-ethyl-3,10-dimethyldodec-2-enoate, and
ethyl 5-thia-3,8,12-trimethyltridec-2-enoate.

EXAMPLE 12

A. A mixture of 1 g. of ethyl 5-thia-10-methoxy-3,6,10-trimethylundec-2-enoate, 60 ml. of ethanol, 0.5 g. of potassium hydroxide and 6 ml. of water is heated at reflux for about hours. The mixture is then diluted with water, neutralized and extracted with ether. The organic phase is washed with water, dried over sodium sulfate and evaporated to yield 5-thia-10-methoxy-3,6,10-trimethylundec-2-enoic acid.

B. Using each of the esters under Column II as the starting material in the process of this example, there is prepared the respective free acids.

EXAMPLE 13

To 0.5 g. of the acid of Example 12A in 10 ml. of benzene, under nitrogen, is added 0.30 ml. of oxalyl chloride, which is stirred for about 45 minutes and then allowed to stand two hours. Two ml. of isopropanol is added. After 3 hours, ether is added and organic layer separated. The organic layer is washed with aqueous sodium bicarbonate and brine, dried over calcium sulfate and concentrated under reduced pressure to yield isopropyl 5-thia-10-methoxy-3,6,10-trimethylundec-2-enoate.

By using each of prop-2-yn-1-ol and prop-2-en-1-ol in the above process, there is obtained prop-2-yn-1-yl 5-thia-10-methoxy-3,6,10-trimethylundec-2-enoate and prop-2-en-1-yl 5-thia-10-methoxy-3,6,10-trimethylundec-2-enoate.

By using each of methanol, cyclopropanol and t-butanol in the process of this example, there is prepared methyl 5-thia-10-methoxy-3,6,10-trimethylundec-2-enoate, cyclopropyl 5-thia-10-methoxy-3,6,10-trimethylundec-2-enoate and t-butyl 5-thia-10-methoxy-3,6,10-trimethylundec-2-enoate.

EXAMPLE 14

A. 50 g. of 3,7-dimethyloct-6-en-1-ol is dissolved in 75 ml. of pyridine and 50 ml. of acetic anhydride and left at room temperature for about forty-eight hours. Then the mixture is extracted with ether and the ethereal extracts washed with water, 10% aqueous HCl and brine to yield 1-acetoxy-3,7-dimethyloct-6-ene, which is purified by distillation.

B. 75 g. of mercuric acetate in 200 ml. of dry ethanol is added to 50 g. of 1-acetoxy-3,7-dimethyloct-6-ene (citronellol acetate) in 100 ml. of dry ethanol cooled in an ice-bath. The temperature is allowed to come to room temperature by standing overnight. Then the mixture is cooled to 0°, 50 g. of potassium hydroxide in 750 ml. of ethanol is added, followed by addition of 5 g. of sodium borohydride in small portions. After about 30 minutes at 0°, water (50 ml.) is added and the mixture left at room temperature for two hours. The mixture is filtered, filtrate concentrated and extracted with ether. The ethereal extract is washed, dried and evaporated to yield 7-ethoxy-3,7-dimethyloctan-1-ol, which is purified by distillation or chromatography.

By using each of methanol and isopropanol in the foregoing process in place of ethanol, there is obtained 7-methoxy-3,7-dimethyloctan-1-ol and 7-isopropoxy-3,7-dimethyloctan-1-ol, respectively.

C. Each of 7-ethoxy-3,7-dimethyloctan-1-ol, 7-methoxy-3,7-dimethyloctan-1-ol and 7-isopropoxy-3,7-dimethyloctan-1-ol is converted into the tosylate, then the bromide and finally the thiol following the procedures described hereinabove. Each of the thusprepared thiols is reacted with ethyl 4-bromo-3-methylbut-2-enoate as in Example 5 or 10 to obtain, respectively -
ethyl 5-thia-12-ethoxy-3,8,12-trimethyltridec-2-enoate,
ethyl 5-thia-12-methoxy-3,8,12-trimethyltridec-2-enoate, and
ethyl 5-thia-12-isopropoxy-3,8,12-trimethyltridec-2enoate.

EXAMPLE 15

A. To a mixture of 1.9 g. of mercuric acetate, 6 ml. of water and 20 ml. of tetrahydrofuran is added 1.69 g. of 2,6-dimethylhept-5-en-1-ol slowly. After addition is complete, the reaction mixture is stirred for about twenty minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about thirty minutes. The mixture is then decanted, concentrated, diluted with water and extracted with ether. The ethereal extract is washed with water, dried over magnesium sulfate and the product purified by chromatography to give 6-hydroxy-2,6-dimethylheptan1-ol.

B. The thus-prepared diol is further processed as in Examples 8 and 9 to yield 6-hydroxy-2,6-dimethylheptan-1-thiol, which by reaction with the bromo-ester of Example 10, in the manner described therein, gives ethyl 5-thia-11-hydroxy-3,7,11-trimethyldodec-2-enoate.

The above process (A and B) is repeated using each of 6-methylhept-5-en-2-ol; 2,6-dimethyloct-5-en-1-ol and 3,7-dimethyloct6-en-1-ol in place of 2,6-dimethylhept-5-en-1-ol to prepare -
ethyl 5-thia-10-hydroxy-3,6,10-trimethylundec-2-enoate,
ethyl 5-thia-11-hydroxy-3,7,11-trimethyltridec-2-enoate and
ethyl 5-thia-12-hydroxy-3,8,12-trimethyltridec-2-enoate.

EXAMPLE 16

A mixture of 1 g. of ethyl 5-thia-11-hydroxy-3,7,11-trimethyldodec-2-enoate, 10 ml. of acetic anhydride and 0.5 g. of dry sodium acetate is refluxed for about 5 hours. After cooling, excess anhydride is removed by vacuum and the residue extracted with ether. The ethereal extract is washed, dried over magnesium sulfate and evaporated to yield the corresponding acetate, ethyl 5-thia-11-acetoxy-3,7,11-trimethyldodec-2-enoate.

EXAMPLE 17

A mixture of 2 g. of ethyl 5-thia-10-hydroxy-3,6,10-trimethylundec-2-enoate, 15 ml. of acetyl chloride and 20 ml. of dry pyridine, under nitrogen, is heated on a steam bath for about six hours. After cooling, the mixture is concentrated under vacuum and the residue taken up in ether. The ether extracts are combined, washed, dried and evaporated to yield the corresponding acetate, ethyl 5-thia-10-acetoxy-3,6,10-trimethylundec-2-enoate.

EXAMPLE 18

Anhydrous hydrogen chloride is bubbled into 100 ml. of dry carbon tetrachloride at 0° until two equivalents are taken up. Five grams of ethyl 5-thia-3,7,11-trimethyldodeca-2,10-dienoate is added and the resulting mixture allowed to stand for about 48 hours at 0°. The mixture is evaporated under reduced pressure to yield ethyl 5-thia-11-chloro-3,7,11-trimethyldodec-2-enoate, which is purified by chromatography.

EXAMPLE 19

To 25 ml. of ice cold ethanol is added 1.0 g. of acetyl chloride. The resulting solution is stirred at 0° for 15 minutes and then 1.0 g. of ethyl 5-thia-3,6,10-trimethylundeca-2,9-dienoate is added. The solution is stirred for one hour at 0° and for 24 hours at room temperature. Solvent is removed under reduced pressure and the concentrate taken up in hexane. The hexane solution is washed with water until neutral and then with brine, dried over calcium sulfate and the solvent evaporated to give ethyl 5-thia-10-chloro-3,6,10-trimethylundec-2-enoate.

EXAMPLE 20

Each of ethyl 5-thia-3,7,11-trimethyldodec-2-enoate and ethyl 5-thia-3,6,10-trimethylundec-2-enoate is hydrolyzed using the procedure of Example 12 to yield the free acid -
5-thia-3,7,11-trimethyldodec-2-enoic acid and
5-thia-3,6,10-trimethylundec-2-enoic acid.

Each of the acids is converted into the acid chloride and reacted with each of prop-2-yn-1-ol and prop-2-en-1-ol to yield -
prop-2-yn-1-yl 5-thia-3,7,11-trimethyldodec-2-enoate and
prop-2-en-1-yl 5-thia-3,6,10-trimethylundec-2-enoate.

Similarly, the acid chlorides are reacted with methanol and isopropanol to yield -
methyl 5-thia-3,7,11-trimethyldodec-2-enoate
isopropyl 5-thia-3,7,11-trimethyldodec-2-enoate
methyl 5-thia-3,6,10-trimethylundec-2-enoate
isopropyl 5-thia-3,6,10-trimethylundec-2-enoate.

What is claimed is:

1. A compound selected from those of the following formula A:

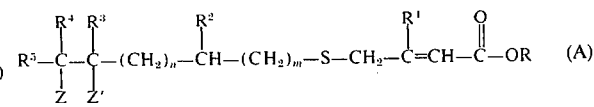

wherein,
R is hydrogen, lower alkyl, lower alkenyl or lower alkynyl;
each of $R^1$, $R^2$, $R^4$ and $R^5$ is lower alkyl;
$R^3$ is hydrogen or methyl;
$n$ is one or two;
$m$ is zero, one, or two;
Z is $OR^6$ in which $R^6$ is hydrogen, lower alkyl or acetyl; and
Z' is hydrogen.

2. A compound according to claim 1 wherein each of $R^2$, $R^4$ and $R^5$ is methyl or ethyl and $R^1$ is methyl.

3. A compound of claim 2 wherein $R^3$ is hydrogen and R is hydrogen, lower alkyl of one to four carbon atoms, prop-2-ynyl or prop-2-enyl.

4. A compound of claim 3 wherein each of $R^2$, $R^4$ and $R^5$ is methyl and n is two.

5. A compound of claim 4 wherein Z is hydroxy, methoxy, ethoxy, isopropoxy or acetoxy.

6. A compound of claim 5 wherein m is zero and Z is hydroxy, methoxy, ethoxy or acetoxy.

7. A compound of claim 6 wherein Z is methoxy or ethoxy and R is methyl, ethyl, isopropyl, prop-2-ynyl or prop-2-enyl.

8. A compound of claim 5 wherein m is one or two and Z is methoxy or ethoxy.

9. A compound of claim 8 wherein R is methyl, ethyl, isopropyl, prop-2-ynyl or prop-2-enyl.

10. The compound, ethyl 5-thia-10-methoxy-3,6,10-trimethylundec-2-enoate, according to claim 7.

11. The compound, ethyl 5-thia-11-methoxy-3,7,11-trimethyldodec-2-enoate, according to claim 9.

* * * * *